United States Patent Office 3,829,465
Patented Aug. 13, 1974

3,829,465
4-(OXOALKOXY)BENZOIC ACIDS AND ESTER THEREOF
John B. Siddall and Clive A. Henrick, Palo Alto, Calif., assignors to Zoecon Corporation, Palo Alto, Calif.
No Drawing. Original application Nov. 12, 1970, Ser. No. 89,022, now Patent No. 3,723,467. Divided and this application Oct. 31, 1972, Ser. No. 302,470
Int. Cl. C07c 69/78
U.S. Cl. 260—473 R         7 Claims

ABSTRACT OF THE DISCLOSURE

Ethers of benzoic acid and benzoic acid esters having an oxo-substituted side chain which are useful for insect control.

CROSS REFERENCE

This is a division of Ser. No. 89,022, filed Nov. 12, 1970, now U.S. Pat. 3,723,467.

INCORPORATION BY REFERENCE

Reference is hereby made to U.S. Pat. 3,723,467. All description therein is incorporated herein by reference.

SUMMARY OF THE INVENTION

Ethers of 4-hydroxybenzoic acid esters having an oxo-substituted saturated, branched aliphatic side chain. Ethers of 4-hydroxybenzoic acid are prepared by saponification of the ethers of 4-hydroxybenzoic acid esters. The acid esters are useful for insect control.

What is claimed is:
1. A compound selected from those of the formulas A or B:

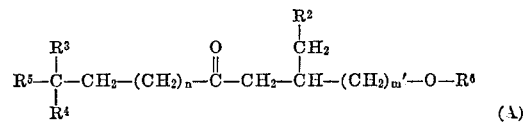

(A)

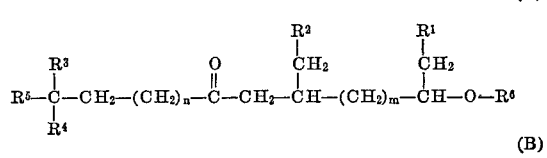

(B)

wherein:
each of $m$ and $m'$ is two or three;
$n$ is zero or one;
each of $R^1$ and $R^2$ is hydrogen or methyl;
$R^3$ is hydrogen, methyl or ethyl;
each of $R^4$ and $R^5$ is methyl or ethyl; and
$R^6$ is 4-methoxycarbonylphenyl or 4-ethoxycarbonylphenyl or 4-carboxyphenyl.

2. A compound according to formula A of claim 1 wherein $m'$ is two; $n$ is zero; and $R^6$ is 4-methoxycarbonylphenyl or 4-ethoxycarbonylphenyl.

3. The compound, methyl 4-(5'-oxo-3',7',7'-trimethylnonyloxy)benzoate, according to claim 2.

4. The compound, ethyl 4-(5'-oxo-3',7',7'-trimethylnonyloxy)benzoate, according to claim 2.

5. The compound, 4-(5'-oxo-3',7',7'-trimethylnonyloxy)benzoic acid, according to claim 1.

6. A compound according to formula B of claim 1 wherein $n$ is zero and $m$ is three.

7. The compound, methyl 4-(6'-ethyl-8'-oxo-10',10'-dimethyldodecan-2'-yloxy) benzoate, according to claim 6.

References Cited

UNITED STATES PATENTS

| | | | |
|---|---|---|---|
| 3,563,982 | 2/1971 | Bowers | 260—340.5 |
| 3,705,187 | 12/1972 | Chodnekar | 260—473 R |
| 3,711,517 | 1/1973 | Siddall | 260—473 R |
| 3,732,254 | 5/1973 | Siddall | 260—473 R |

FOREIGN PATENTS

| | | | |
|---|---|---|---|
| 883,234 | 11/1961 | England | 260—473 R |

OTHER REFERENCES

Bowers, Science *164* 323 (1969).
Ayyar et al. C.A. *69* 19320a (1968).
Mori et al. C.A. *72* 67126a (1970).
Etimora et al. C.A. *75* 5426b (1971).

LORRAINE A. WEINBERGER, Primary Examiner
J. F. TERAPANE, Assistant Examiner

U.S. Cl. X.R.
260—521 R